(12) United States Patent
Kathol et al.

(10) Patent No.: US 8,177,873 B2
(45) Date of Patent: May 15, 2012

(54) SEPARATING DEVICE FOR SEPARATING OUT PARTICLES

(75) Inventors: Ulrich Kathol, Moers (DE); Dieter Naβ, Moers (DE); Lars Schlüter, Moers (DE)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 12/225,622

(22) PCT Filed: Feb. 20, 2007

(86) PCT No.: PCT/EP2007/051584
§ 371 (c)(1),
(2), (4) Date: Sep. 28, 2010

(87) PCT Pub. No.: WO2007/110284
PCT Pub. Date: Oct. 4, 2007

(65) Prior Publication Data
US 2011/0005179 A1 Jan. 13, 2011

(30) Foreign Application Priority Data
Mar. 27, 2006 (EP) .................................. 06006325

(51) Int. Cl.
*B01D 46/00* (2006.01)
(52) U.S. Cl. ................. 55/414; 55/428; 55/440; 55/423
(58) Field of Classification Search .................... 55/414, 55/428, 440, 423
See application file for complete search history.

(56) References Cited

U.S. PATENT DOCUMENTS

| 1,818,994 | A |   | 8/1931  | Kreisinger          |
|-----------|---|---|---------|---------------------|
| 3,729,901 | A | * | 5/1973  | Jackson ........................... 96/329 |
| 3,989,489 | A |   | 11/1976 | Van't Sant et al.   |
| 5,004,552 | A | * | 4/1991  | Al-Yazdi ....................... 210/789 |

FOREIGN PATENT DOCUMENTS

| DE | 385945 C      | 12/1923 |
| DE | 2 256 678 A1  | 5/1974  |
| DE | 30 35 828 A1  | 5/1982  |
| DE | 196 51 857 C1 | 2/1998  |
| FR | 2857058 A1    | 1/2005  |
| JP | 56144720 A    | 11/1981 |
| WO | 9311852 A1    | 6/1993  |

OTHER PUBLICATIONS

Publication from Yamaguchi International Patent Office, Jul. 21, 2011, pp. 1-2, 1-4.

* cited by examiner

*Primary Examiner* — Jason M Greene
*Assistant Examiner* — Dung H Bui

(57) ABSTRACT

A separating apparatus for separating out particles, especially liquid droplets from a gas flow which comprises the particles, comprising a flow channel which conducts the gas flow and has at least one deflection region for deflecting the gas flow, and a collecting vessel for accommodating the particles, the flow channel also having a branch leading to the accommodation vessel for separating the particles out of the gas flow, is in accordance with the invention, characterized in that, in addition to the branch, a line opens into the accommodation vessel and connects the accommodation vessel to the flow channel in a fluid-conducting manner.

17 Claims, 2 Drawing Sheets

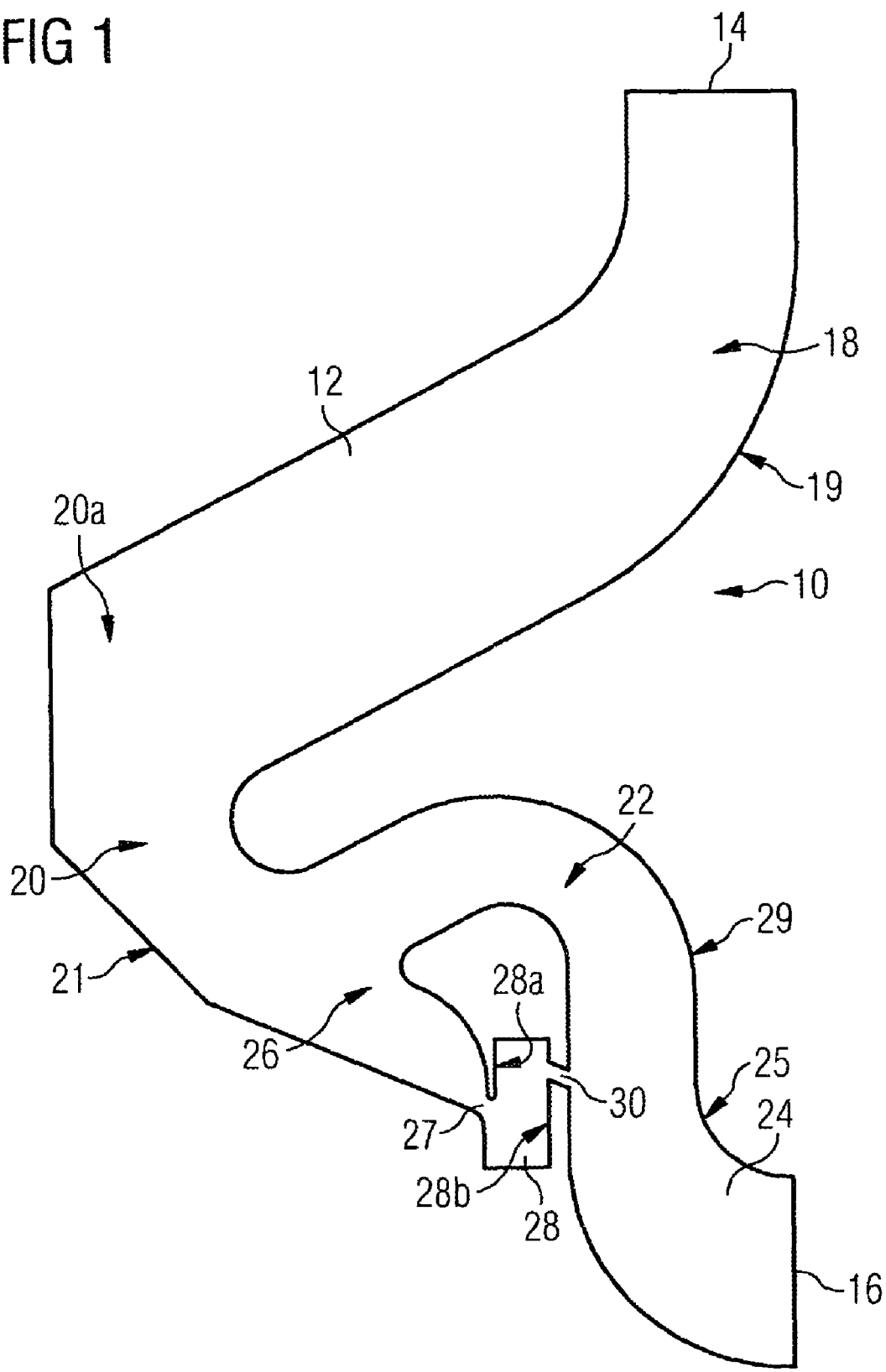

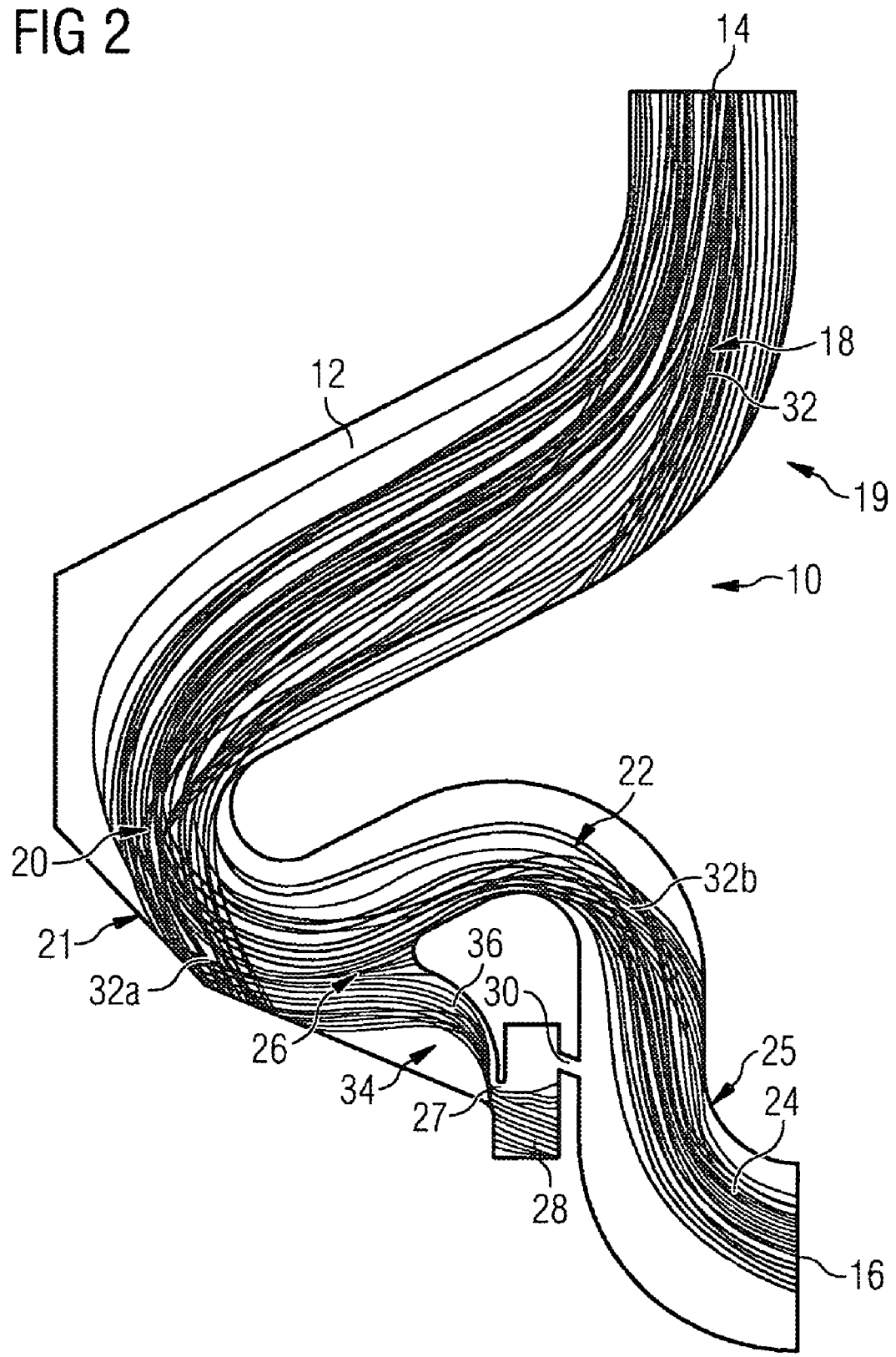

SEPARATING DEVICE FOR SEPARATING OUT PARTICLES

CROSS REFERENCE TO RELATED APPLICATIONS

This application is the US National Stage of International Application No. PCT/EP2007/051584, filed Feb. 20, 2007 and claims the benefit thereof. The International Application claims the benefits of European application No. 06006325.2 filed Mar. 27, 2006, both of the applications are incorporated by reference herein in their entirety.

FIELD OF INVENTION

The present invention relates to a separating device for separating out particles, especially liquid droplets, from a gas flow which contains the particles, with a flow passage which guides the gas flow and has at least one deflecting region for deflecting the gas flow, and with a collecting vessel for receiving the particles, wherein the flow passage furthermore has a branch for separating out the particles from the gas flow and which leads to the collecting vessel.

BACKGROUND OF THE INVENTION

Such separating devices can be used for separating out solid particles, such as dust or sand, and also especially for separating out particles in the form of liquid droplets.

Separating devices for separating out liquid droplets are used for example in petrochemical refineries and especially in air separation plants for industrial gases. In such plants, compressor stages which have radial compressor shafts are arranged in series. Separating devices of the aforementioned type can be connected between these compressor stages. As a result, compressed moist gas, such as compressed moist air, which leaves a cooler of the upstream compressor stage, can be introduced into the separating device. When falling below the dew point of the water component, a certain water quantity and droplet size in the incoming gas flow is to be reckoned with. The gas flow follows the deflecting region of the flow passage. The liquid droplets, on account of their inertia, cannot completely follow the deflecting region and as a result drift in the direction of the radially outwardly lying section of the flow passage. The liquid droplets should then reach the collecting vessel via the branch.

In order to avoid a gas build-up upstream of the collecting vessel separate motor-operated suction devices are often provided on the collecting vessel in the prior art, which are correspondingly expensive and time-consuming to realize.

A separating out of solid or liquid components from gases or vapors is already known from German patent document DE 38 59 45, in which before entry into a compressor the gas which is laden with the foreign bodies is deflected and at the end of the deflection on the outer radius a depositing opening is provided, into which the components of the flow with higher density enter. Since in addition to these components which are to be separated out components of the gas which is to be compressed also pass through the depositing opening, the connecting line is provided with a recirculation passage so that the portions of the gas which are freed of the foreign bodies can enter the fluid flow again upstream. A disadvantage of the known arrangement is the lack of provision against congestion phenomenon in the line for carrying away the foreign matter. Particularly in the region of the connection of the recirculation line to the separating line congestions can occur on the way to a collecting vessel since no solution is disclosed to ensure a pressure relief in the collecting vessel. Different embodiments of flue gas dedusting plants are known from documents DE 196 51 857, U.S. Pat. No. 1,818, 994, DE 2 256 678, and DE 30 35 828.

SUMMARY OF INVENTION

An object which forms the basis of the invention is to improve a separating device of the type mentioned in the introduction to the extent that an improved separation of the particles of the gas flow can be achieved without great additional expenditure.

This object is achieved according to the invention with a generic-type separating device in which in addition to the branch a pipe leads to the collecting vessel and connects the collecting vessel to the flow passage in a fluid-directing manner. As a result, a fluid-directing connection exists on the one hand between the collecting vessel and the flow passage via the branch of the flow passage, and on the other hand via the pipe which also connects the collecting vessel to the flow passage in a fluid-directing manner.

In this way, an automatic pressure balance between the collecting vessel and the flow passage is achieved. By means of the pipe, a "ventilation flow" can be formed. The solution according to the invention therefore makes it possible to avoid a gas build-up in the flow passage in the region of the branch in a cost-efficient manner. As a result of the pipe connecting the collecting vessel to the flow passage in a fluid-directing manner, a suction effect is especially created in the collecting vessel as a result of the gas flow which is present in the flow passage. That is to say, the gas which flows with the particles into the collecting vessel is drawn in by the pipe on account of this suction effect. In this way, a gas build-up in the flow passage in the region of the branch is avoided and therefore the depositing of the particles into the collecting vessel is improved. In particular, the pipe leads both into the collecting vessel and into the flow passage. The previously described suction effect can therefore develop even better. As a result of the fluid-directing connection according to the invention of the collecting vessel to the flow passage by means of the pipe, furthermore, the necessity for installing a bulky and cost-intensive suction device is avoided.

In an advantageous embodiment, the pipe connects the collecting vessel in a fluid-directing manner to a region of the flow passage which is located downstream with regard to the branch. That is to say, the pipe creates a fluid-directing connection to a region of the flow passage which the gas flow passes through only after flowing past the branch. As a result of this arrangement, the pipe can be especially compactly constructed. In this way, an especially good suction effect in the collecting vessel can be created.

In order to design the ventilation as efficiently as possible it is advantageous if the vessel has a first wall section and also a second wall section which lies opposite this, wherein the branch leads into the collecting vessel on the first wall section and the pipe leads into the collecting vessel on the second wall section. In this way, the "ventilation flow" which is formed by means of the pipe has the same direction as the gas flow which enters the collecting vessel via the branch, as a result of which a back-pressure of the gas flow in the region of the branch can be especially efficiently avoided.

It is furthermore advantageous if the branch is arranged in the deflecting region, especially on the inner side on a radially outwardly lying wall section of the deflecting region. As a result, the particles can be especially efficiently separated out from the gas flow since these converge upon the radially outwardly lying wall section of the deflecting region on account of the change of direction of the flow passage in the deflecting region. By provision of the branch in this region the particles can be especially efficiently deposited into the collecting vessel.

In a moreover advantageous embodiment the flow passage furthermore has a second deflecting region which is arranged downstream with regard to the deflecting region, by means of which a change of direction of the gas flow is brought about which is opposite to a change of direction of the gas flow which is brought about by means of the first deflecting region. As a result, a course can be given to the flow passage which encompasses the collecting vessel virtually from two sides. This enables the pipe between the collecting vessel and the flow passage to be especially compactly constructed, as a result of which an especially efficient pressure balance in the collecting vessel is made possible. Furthermore, it is advantageous if a fourth deflecting region adjoins the second deflecting region, by means of which a further change of direction of the gas flow is brought about, which in turn is opposite to the change of direction of the gas flow which is brought about by means of the second deflecting region.

Furthermore, it is expedient if the first deflecting region of the flow passage describes essentially a U-shape, and especially brings about a deflection of the gas flow by about 180°. As a result of such a design of the first deflecting region of the flow passage the particles which are to be separated out are pushed in large numbers onto the radially outwardly lying wall section of the first deflecting region and therefore by means of the branch can be especially efficiently deposited into the collecting vessel.

Furthermore, it is expedient if the branch is arranged at a point of the deflecting region at which the direction of the flow passage, is rotated by at least 90° in relation to the direction of the flow passage at a start of the deflecting region on the inflow side. That is to say, the branch is arranged at a point of the deflecting region at which the deflecting region has already executed a curve of at least 90°. At this point, the particles are already arranged in large numbers on the radially outwardly lying wall section of the flow passage and as a result can be efficiently diverted into the collecting vessel.

In order to further improve the effectiveness of the separating device it is advantageous if the flow passage furthermore has a third deflecting region which is arranged upstream with regard to the first deflecting region, by means of which a change of direction of the gas flow is brought about which is opposite to a change of direction of the gas flow which is brought about by means of the first deflecting region. In particular, the flow passage first of all has a third deflecting region which is curved in a specific direction, which the first deflecting region with an opposite direction of curvature, which includes the branch, adjoins. The particles therefore converge upon the radially outwardly lying wall section of the third deflecting region on account of the curvature of the third deflecting region. The particles cannot correspondingly follow the renewed deflection as a result of the first deflecting region which follows it, and, with the corresponding arrangement of the branch on the first deflecting region, are consequently efficiently received by the collecting vessel.

In a further advantageous embodiment, the flow passage, in a region which is located downstream with regard to the branch, has cross-sectional areas of essentially equal size along the flow passage at a plurality of points, especially at all the points, of the region. In particular, the gas flow, after flowing past the branch, is carried forward in the flow passage with cross-sectional area which remains essentially constant. As a result, flow losses in the gas flow are largely avoided.

BRIEF DESCRIPTION OF THE DRAWINGS

An exemplary embodiment of a separating device according to the invention is subsequently explained in more detail with reference to the attached schematic drawings. In the drawing:

FIG. 1 shows a sectional view of an exemplary embodiment of the separating device according to the invention, and also FIG. 2 shows the sectional view according to FIG. 1 with a diagrammatic representation of the distribution of water droplets which exists in the separating device during the operation of the separating device.

DETAILED DESCRIPTION OF INVENTION

The exemplary embodiment of the separating device 10 according to the invention which is shown in FIG. 1 comprises a flow passage 12 which extends between an inlet 14 and an outlet 16. The inlet 14 can be connected to a cooler of a compressor stage, which is not diagrammatically shown, for example of an air separation plant, and during operation receives compressed moist gas in the form of compressed moist air which leaves the cooler. A further compressor stage of an air separation plant can be arranged at the outlet 16.

The compressed moist air contains a multiplicity of liquid droplets of different diameter. The flow passage 12 first of all has a third deflecting region 18 which adjoins the inlet 14 and is curved to the right, and brings about a change of direction of the flow passage 12 by about 60°. A first deflecting region 20, which describes essentially a U-shape and is curved to the left, adjoins this third deflecting region. A branch 26, which leads to a first wall section 28a of a collecting vessel 28 or of a so-called water chamber, is provided on a radially outwardly lying wall section 21 of the first deflecting region 20. The branch 26 is formed as a duct which constantly narrows in cross section and is arranged at a point of the first deflecting region 20 at which the direction of the flow passage 12 is rotated by more than 90° in relation to the direction of the flow passage 12 at the start 20a of the first deflecting region 20 on the inflow side.

The flow passage 12 has a right-hand curved second deflecting region 22 which adjoins the left-hand curved first deflecting region 20 and brings about a change of direction of the flow passage 12 by an angle of about 135°. A left-hand curved fourth deflecting region 24 in turn adjoins this second deflecting region and brings about a change of direction of the flow passage 12 by an angle of about 90°. The collecting vessel 28 is connected via a pipe 30 in a fluid-directing manner to the region 29 of the flow passage 12 which is located downstream with regard to the branch 26. The pipe 30 on the one hand leads to a second wall section 28b which lies opposite the first wall section 28a of the collecting vessel 28, and on the other hand leads to the flow passage 12 in a transition region between the second deflecting region 22 and the fourth deflecting region 24. The pipe 30 serves for the automatic pressure balance of the collecting vessel 28. As a result, an air build-up in the flow passage 12 in the region of the branch 26 is avoided.

FIG. 2 shows a distribution of liquid droplets 32 in the form of water droplets in the gas or air flow which is directed through the separating device 10. As can be gathered from FIG. 2, the liquid droplets 32, by means of the right-hand curved third deflecting region 18, are first of all guided onto a radially outwardly lying wall section 19 of the third deflecting region 18. By means of the left-hand curved first deflecting region 20 which adjoins the third deflecting region, the liquid droplets 32 are then guided onto the radially outwardly lying wall section 21 of the first deflecting region 20 of the flow passage 12. After that, the liquid droplets 32 in large numbers are deposited into the collecting vessel 28 via the branch 26. In this case, the deposited liquid droplets 32 are primarily heavy liquid droplets 32a with a large diameter. Light liquid droplets 32b with a smaller diameter are entrained with the air flow into the second deflecting region 22 of the flow passage 12.

In the region of the branch 26, a recirculation region 34 is formed so that the liquid droplets 32 in a narrow flow path 36 above the recirculation region 34 enter the collecting vessel 28 at an acute angle. The liquid droplets 32 are deposited in the collecting vessel 28 in its lower section. The light liquid droplets 32b which are entrained by the air flow, after flowing past the branch 26, are pushed towards the radially inwardly lying wall section 25 of the fourth deflecting region 24 through the arrangement in series of the second deflecting region 22 and the fourth deflecting region 24.

The invention claimed is:

1. A separating device for separating out liquid droplets from a gas flow, comprising:
   a flow passage that guides the gas flow and which comprises a first deflecting region for deflecting the gas flow; and
   a collecting vessel that receives the particles, wherein the flow passage further comprises
      a branch that leads to the collecting vessel, for separating out the particles from the gas flow, and is provided on a radially outwardly lying wall section of the first deflecting region, and
      a pipe that leads to the collecting vessel and connects the collecting vessel to a region of the flow passage away from which the particles have been directed such that a suction effect is created in the collecting vessel as a result of the gas flow present in the flow passage.

2. The separating device as claimed in claim 1, wherein the pipe connects the collecting vessel in a fluid-directing manner to a region of the flow passage located downstream with regard to the branch.

3. The separating device as claimed in claim 1, wherein the collecting vessel has a first wall section and also a second wall section that lies opposite the first wall section, wherein the branch leads to the collecting vessel on the first wall section and the pipe leads to the collecting vessel on the second wall section.

4. The separating device as claimed in claim 1, wherein the branch is arranged on the inner side on a radially outwardly lying wall section of the first deflecting region.

5. The separating device as claimed in claim 1, wherein the flow passage has a second deflecting region arranged downstream with respect to the first deflecting region, where a change of direction of the gas flow is brought about and is opposite to the change of direction of the gas flow caused by the first deflecting region, where the first deflecting region and the second deflecting region together enable a relatively short ventilation flow bypass path through the collection vessel.

6. The separating device as claimed in claim 1, wherein the first deflecting region of the flow passage describes essentially a U-shape, bringing about a deflection of the gas flow by approximately 180°.

7. The separating device as claimed in claim 1, wherein the branch is arranged at a point of the first deflecting region at which the direction of the flow passage is rotated by at least 90° relative to the direction of the flow passage at a start of the first deflecting region on the inflow side.

8. The separating device as claimed in claim 1, wherein the flow passage further comprises a third deflecting region arranged upstream with regard to the first deflecting region, where a third change of direction of the gas flow is brought about opposite to a first change of direction of the gas flow brought about by the first deflecting region.

9. The separating device as claimed in claim 1, wherein the flow passage, in a region located downstream with regard to the branch, has cross-sectional areas of essentially equal size along the flow passage at a plurality of points of the region.

10. A separating device for separating out liquid droplets from a gas flow, comprising:
    a flow passage that guides the gas flow, the flow passage comprising a first deflecting region for deflecting the gas flow; and
    a collecting vessel that receives the particles,
    wherein the flow passage further comprises:
       a branch that leads to the collecting vessel, for separating out the particles from the gas flow, and is provided on a radially outwardly lying wall section of the first deflecting region, wherein the branch is configured to form a recirculation region therein effective to form a narrowed flow path within the branch rich with the particles; and
       a pipe that leads to the collecting vessel and connects the collecting vessel to the flow passage such that a suction effect is created in the collecting vessel as a result of the gas flow present in the flow passage.

11. The separating device of clam 10, wherein the narrowed flow path is effective to direct the particles into the collecting vessel at an acute angle.

12. The separating device of clam 10, wherein the branch comprises a constantly narrowing cross section in a downstream direction.

13. The separating device of clam 10, wherein the flow passage comprises a second deflecting region arranged downstream with respect to the first deflecting region, where a change of direction of the gas flow is brought about and is opposite to the change of direction of the gas flow caused by the first deflecting region, where the first deflection region and the second deflection region together enable a relatively short ventilation flow bypass path through the collection vessel.

14. A separating device for separating out liquid droplets from a gas flow, comprising:
    a flow passage that guides the gas flow and which comprises a first deflecting region and a second deflecting region for deflecting the gas flow; and
    a collecting vessel that receives the particles, wherein the flow passage further comprises
       a branch that leads to the collecting vessel, for separating out the particles from the gas flow, and is provided on a radially outwardly lying wall section of the first deflecting region, and
       a pipe that leads to the collecting vessel and connects the collecting vessel to the flow passage such that a suction effect is created in the collecting vessel as a result of the gas flow present in the flow passage,
    wherein the second deflecting region is arranged downstream with respect to the first deflecting region, where a change of direction of the gas flow is brought about and is opposite to the change of direction of the gas flow caused by the first deflecting region, where the first deflection region and the second deflection region together enable a relatively short ventilation flow bypass path through the collection vessel.

15. The separating device of claim 14, wherein the branch is configured to form a recirculation region therein effective to form a narrowed flow path within the branch and comprising the particles.

16. The separating device of claim 15, wherein the narrowed flow path is effective to direct the particles into the collecting vessel at an acute angle.

17. The separating device of claim 14, wherein the pipe connects the collecting vessel to a region of the flow passage away from which the particles have been directed.

* * * * *